(12) United States Patent
Riedel

(10) Patent No.: US 6,918,120 B2
(45) Date of Patent: Jul. 12, 2005

(54) REMOTE FILE SYSTEM USING NETWORK MULTICAST

(75) Inventor: Erik Riedel, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 09/838,177

(22) Filed: Apr. 20, 2001

(65) Prior Publication Data

US 2002/0156931 A1 Oct. 24, 2002

(51) Int. Cl.$^7$ ................................................. G06F 3/00
(52) U.S. Cl. ....................... 719/313; 719/315; 709/201; 709/203
(58) Field of Search ................................... 719/310, 313, 719/315; 709/201–203, 224, 310, 313, 314, 227, 250; 707/10; 714/6; 370/389, 236, 408, 244, 252, 390; 713/200

(56) References Cited

U.S. PATENT DOCUMENTS

| | | | | |
|---|---|---|---|---|
| 5,079,767 A | * | 1/1992 | Perlman | 370/408 |
| 5,317,746 A | * | 5/1994 | Watanabe | 713/200 |
| 5,513,314 A | * | 4/1996 | Kandasamy et al. | 714/6 |
| 5,926,636 A | * | 7/1999 | Lam et al. | 709/313 |
| 6,058,113 A | * | 5/2000 | Chang | 370/390 |
| 6,279,038 B1 | * | 8/2001 | Hogan et al. | 709/224 |
| 6,381,215 B1 | * | 4/2002 | Hamilton et al. | 370/236 |
| 6,421,673 B1 | * | 7/2002 | Caldwell et al. | 707/10 |
| 6,515,967 B1 | * | 2/2003 | Wei et al. | 370/244 |
| 6,515,968 B1 | * | 2/2003 | Combar et al. | 370/252 |
| 6,560,656 B1 | * | 5/2003 | O'Sullivan et al. | 709/250 |
| 6,584,101 B2 | * | 6/2003 | Hagglund et al. | 370/389 |
| 6,604,142 B1 | * | 8/2003 | Bertrand et al. | 709/227 |

OTHER PUBLICATIONS

Zang et al. "Object–Oriented design of Adaptive Multicast Communications" IEEE 1999, pp. 1–6.*
Gemmell et al. "Fcast Multicast File Distribution" IEEE 2000, pp. 1–14.*
Gronvall, B. et al., "The Design of a Multicast-based Distributed File System," Swedish Institute of Computer Science and Lulea University of Technology, 1999, 14 pages.
Karamanolis, C. et al., "Client–Access Protocols for Replicated Services," IEEE Transactions on Software Engineering, vol. 25, No. 1, Jan./Feb. 1999, 19 pages.

* cited by examiner

Primary Examiner—Meng-Al T. An
Assistant Examiner—Van Hoa Nguyen

(57) ABSTRACT

The present invention provides a split data and meta data distributed system operable to provide computer file services. The system includes a plurality of servers that include meta data servers and data servers. A client multicasts a message, including a request (e.g., a data request or a meta data request) to the plurality of servers in the system. The client considers the plurality of servers to be a single server instance. The servers may be divided into different subsets, and each subset is responsible for data requests or meta data requests. The servers that are responsible for the particular type of received request may respond to the request. Also, if multiple servers in a subset generate a request, the system may synchronize the responses, such that a single response, rather than multiple responses are transmitted to the client. This synchronization may not be necessary for responses to requests that do not change the stored state of the system.

14 Claims, 2 Drawing Sheets

REMOTE FILE SYSTEM USING NETWORK MULTICAST

FIELD OF THE INVENTION

The present invention is generally related to a computer system. More particularly, the present invention is related to a distributed file system utilizing multicasting.

BACKGROUND OF THE INVENTION

As the number of personal computers, workstations, and other intelligent devices continues to grow, the amount of data stored and accessed by these devices also continues to grow. Users generally prefer to keep files at their fingertips, even those that are rarely used, but are nevertheless valuable. Accordingly, distributed file systems are typically used for storing and retrieving data from remote locations. Distributed systems typically provide a computer service (e.g., a computer file service) through a plurality of processes executed on a plurality of nodes in a computer network.

Multicasting is a conventional communication technique for transmitting a single message to multiple devices. In an article entitled "The Design of a Multicast-Based Distributed File System", Gronvall et al. discloses a distributed file system that uses multicasting to limit the need to know the precise location of data. A node in a network multicasts a request for data to all nodes simultaneously (e.g., a request is transmitted on a multicast channel to all nodes that are connected to the channel). Any node that is storing a replica of the requested data can respond. To implement this system, however, a modification of the client software is required. Accordingly, this system suffers from drawbacks, such as increased cost for creating and testing the modified code and delaying the implementation of the system due to testing.

Karamanolis et al., in an article entitled "Client-Access Protocols for Replicated Services", also discloses employing multicasting in a distributed system. In fault tolerant distributed file systems, multiple data servers (i.e., mirrors) may store identical data. Therefore, if one data server fails, a mirror may respond to a request for data without the entire system becoming inoperative. However, when mirrors are used in a distributed system, each mirror in the system may respond to a single request. Thus, multiple identical responses may be transmitted to a client making the request. Karamanolis et al. further discloses a distributed system including mirrors, and a synchronization technique, such as described in section 5.2.1, that includes a method for providing a single response to a request when multiple servers in the distributed system are operative to respond to the request. The disclosed synchronization technique may not necessarily require modification to client code. However, both Karamanolis et al. and Gronvall et al. may not distinguish between different types of requests, and both do not disclose efficient techniques for responding to different types of requests.

SUMMARY OF THE INVENTION

The present invention facilitates an improved distributed system that provides fault tolerant operation and that can be implemented without necessarily modifying client code. The system of the present invention also may distinguish between different types of requests and efficiently respond to different types of requests.

In one respect, the present invention provides a split data and meta data distributed system that includes a client and a plurality of servers. The plurality of servers include a meta server and at least one data server, and the client is operable to multicast a communication to the plurality of servers without modifying client code. Accordingly, this system may be readily implemented.

In another respect, the system of the present invention includes at least two data servers that provide fault tolerant operation. The data servers are operable to store the same data, such that one data server contains a mirror image of the data stored in the other data server. Also, the servers may respond to data requests based on a predetermined arrangement, which may not require the data servers to communicate with each other for determining which server will respond to the request. Thus, traffic between the servers in the system is minimized, and a data server may respond to a request faster.

Those skilled in the art will appreciate these and other advantages and benefits of various embodiments of the invention upon reading the following detailed description with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
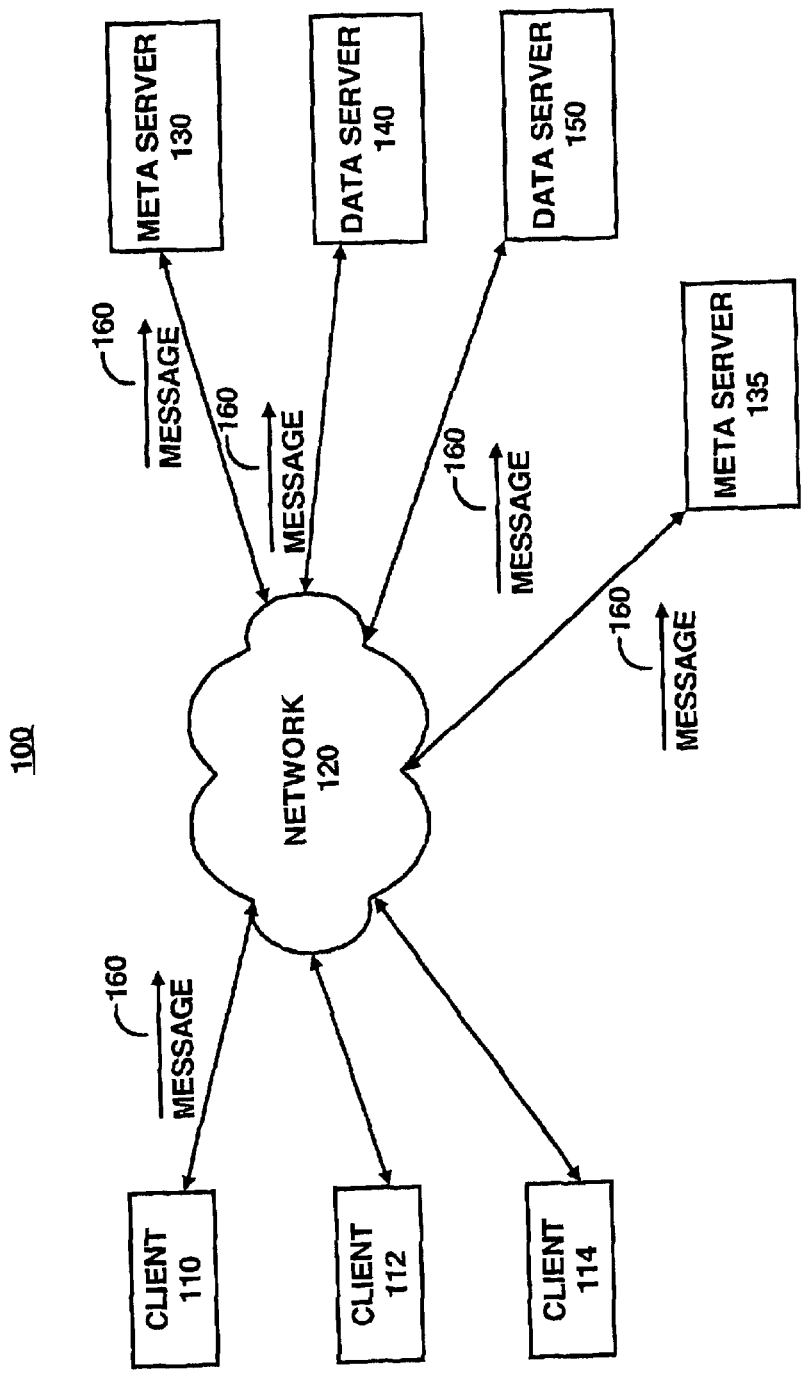
FIG. 1 illustrates schematic block diagram of an exemplary split data and meta data system that employs the principles of the present invention.

FIG. 1 illustrates split data and meta data system 100 employing the principles of the present invention. System 100 includes at least clients 110, 112 and 114 connected to meta server 130, a meta server 135, a data server 140 and a data server 150 via a network 120. It will be apparent to one of ordinary skill that system 100 can include one client or a plurality of clients in communication with one or more servers over one or more networks. Additionally, system 100 may include conventional network nodes, other than servers, that perform the functions of the servers of the present invention.

Although two meta servers and two data servers are shown in FIG. 1, system 100 can include one or more data servers and meta servers. Also, the present invention, including system 100, is described in detail below generally with reference to a distributed system providing a computer file service. However, it will be apparent to one of ordinary skill that the principles of the present invention can be applied to a distributed system that provides a computer service other than a computer file service, without departing from the spirit and scope of the present invention.

System 100 is configured to multicast messages (e.g., meta requests and data requests) from clients 110, 112 and 114 to servers 130, 135, 140 and 150. For example, client 110 multicasts message 160 to servers 130, 135, 140 and 150. Multicasting may be performed, for example, by sending one message, including the request, to an IP address for a multicast group that contains the collection of metadata and data servers for the file system, such as servers 130, 135, 140 and 150. A client/server file system (e.g., a Network File System (NFS), a Common Internet File System (CIFS) or other known file system) loaded on each of servers 130, 135, 140 and 150 may be configured to allow each server to be a member of a multicast group.

Servers 130, 135, 140 and 150, receiving the multicasted message 160, determine the type of request (e.g., data or meta data) that is included in message 160 and servers 130–150 may respond accordingly. For example, if message 160 includes a data request, a data server responds, such as data server 140. If message 160 includes a meta request, a meta server responds, such as meta server 130. This technique reduces the size of a server subset (i.e., the number of servers that may respond to the request) and improves efficiency for the file management service provided by servers 130–150 or any service that divides data and meta data requests or that splits requests by type. This applies for meta data requests, which may include meta data requests in the NFS protocol (e.g., CREATE, GETATTR, ATTR, SETATTR, READDIR, and the like), and data requests (e.g., READ and WRITE).

Additionally, system 100 is operable to provide fault tolerant operation of the computer service provided by system 100. For example, at least two data servers 140 and 150 (i.e., mirrors) may store the same data and determine whether to respond to a read request based on a predetermined arrangement or based on communication between each other. For example, based on a predetermined arrangement, data servers 140 and 150 may alternate responding to read requests for data stored in both servers 140 and 150. For example, data server 140 may respond to every other data request, or data server 140 may respond to a set of data requests and data server 150 may respond to the next set of data requests.

Alternatively, data servers 140 and 150 may communicate with each other, for example, to determine which server has the least congested communication path. For example, data server 140 may be connected to network 120 and/or client 110 via a first communication path and data server 150 may be connected to network 120 and/or client 110 via a second communication path. Data servers 140 and 150 transmit messages to each other to determine which server has the least congested communication path. Congestion of the communication paths may be determined by any one of various conventional methods known to one of ordinary skill in the art. The determination may be performed periodically or performed after a request is received by data servers 140 and 150. The data server with the least congested communication path responds to the data request.

Servers 130–150 may also synchronize responses, such that only a single response is provided for each request. For example, servers 130–150 may be divided into two subsets, each subset associated with a request type (e.g., a data subset including data servers 140 and 150, and a meta data subset including meta data servers 130 and 135). A synchronization server may be designated for each server subset, such that synchronization may be performed by a minimal number of servers (i.e., the servers in a relevant subset). Synchronization may include reliably broadcasting the multicast message to each server in the subset in order to insure that each server has received the message. Also, synchronization may include transmitting a single response for each request. For example, two mirrors may respond to a read request, because each mirror stores the requested data. The synchronization server may determine, for example, at the instance of receipt of the request, which server's response will be transmitted to the client. The decision may be based on a predetermined arrangement or based on a least congested communication path to the client, as described above. Also, one server in the subset may respond to the request, and reliably broadcast a message to each server in the subset indicating that a response to that request has been transmitted. The servers receiving the message may then delete that request from their respective queues.

Alternatively, for operations that do not change the state of the system, but only return data to a client (e.g., READ and GETATTR for NFS), responses need not be synchronized. A request that requires returning data to the client is multicast to the group, and multiple servers in a subset may respond to the same request. Multiple identical responses may then be transmitted to the client, and the client may store information provided with the first received response and drop subsequent identical responses. This technique may not require modification to the client code, because conventional client code may function to drop identical responses. This reduces the amount of communication among the servers. Also, it speeds the response to the client, reducing apparent latency (time between client request and response).

Further, when a server responds to the request, the server may reliably transmit a message to other servers in the subset indicating that a response for the request has been transmitted to the client. Servers in the subset receiving the message may then delete the request from their queue. Therefore, the number of duplicate responses transmitted to the client may be minimized.

Figure 2:
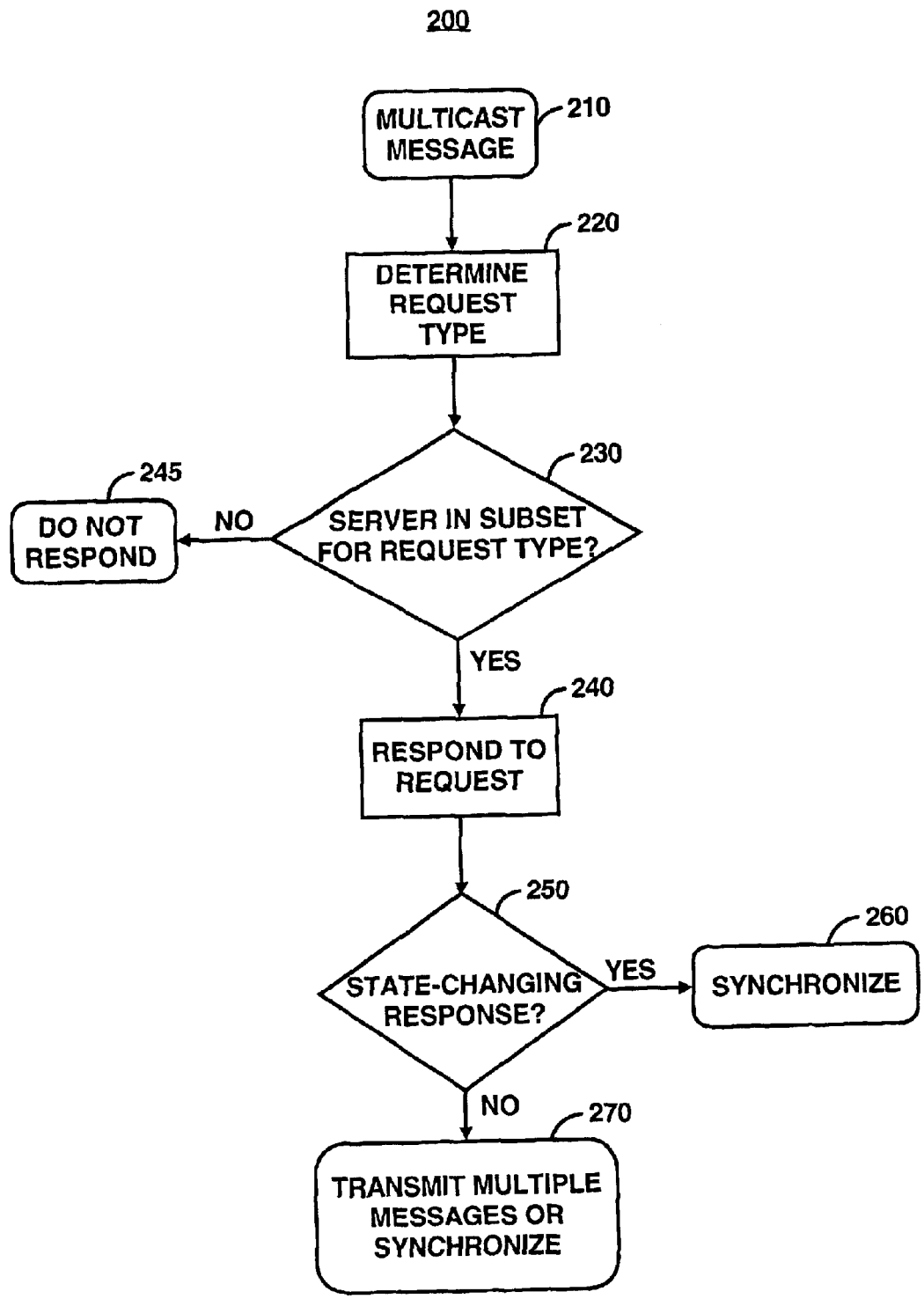
FIG. 2 illustrates a flow diagram of an exemplary method, according to a preferred embodiment of the present invention.

FIG. 2 illustrates an exemplary method 200 for multicasting a message and responding to the multicasted message. In step 210, a client multicasts a message on a network to servers in the distributed system. In step 220, a server receives the message and determines the request type. For example, the server determines whether the request is a data request or a meta data request.

In step 230, the server determines whether it is in the server subset for that type of request. For example, if the message includes a meta data request, the server determines whether it is in the meta server subset for responding to that request. If the message includes a data request, the server determines whether it is in the data server subset for responding to that request. The system may include multiple data server subsets and meta data server subsets.

In step 240, if the server is in the server subset, the server responds to the request. In step 245, if the server is not in the server subset, the server does not respond.

In step 250, a determination is made as to whether the request is requesting a response that changes the state of the system. For example, WRITE requests in NFS and the like require state-changing responses, because these requests require changing the state of data (e.g., storing data, deleting data and the like). READ and GETATTR in NFS are requests that do not change the state of data stored in the system.

If the request requires a state-changing response, the responses may be synchronized (step 260). For example, a synchronization server may be designated for each server subset for synchronizing state-changing responses, such that a single response is provided for each request. Alternatively, responses may be handled by a server subset using a predetermined arrangement or by a server having a least congested communication path.

If the request requires a non-state-changing response, multiple responses may be transmitted to the client (step 270). For this type of request, more than one server in the subset may transmit a response to the client. In step 270, the responses may also be synchronized, similarly to step 260, to minimize traffic on the network.

The method shown in FIG. 2 and described above can be performed by a computer program. The computer program can exist in a variety of forms both active and inactive. For example, the computer program can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

Also, the method shown in FIG. 2 and described above may be performed by a process facilitating a service in a distributed system or performed by a separate process executed on a host in the distributed system. Additionally, although the present invention has been described with respect to NFS, the present invention may be employed with other conventional distributed file system protocols.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of responding to a request in a distributed system, said distributed system including a plurality of hosts, wherein each host is operable to respond to at least one type of request, the method comprising steps of:
   receiving a multicasted message, said message including a request;
   determining if said request is of a first type or a second type;
   designating a subset of said plurality of hosts for said first and second types of request;
   responding to said request if said request is of the first type; and a host of said plurality of hosts responding to said request is included in a subset for said first type of said request and, the host ignores said request if said request is of the second type;
   wherein said step of responding further comprises determining whether responding to said request includes providing a state-changing response; generating multiple responses from multiple hosts in said subset for said first type of said request; transmitting said multiple responses to a client in response to said responding including a non-state-changing-response; and synchronizing said multiple responses by transmitting a single response to said client response to said multiple hosts in said subset generating the state-changing-response.

2. The method of claim 1, wherein said step of synchronizing further comprises a step of designating a synchronizing host operable to facilitate transmitting the single response to said client.

3. The method of claim 2, wherein said step of synchronizing further comprises steps of:
   transmitting a message to each host in said subset for said first type of said request, said message indicating that a response has been transmitted to said client; and
   deleting said request from a queue for each host receiving said message.

4. The method of claim 1, wherein said first and second types of requests includes one of a meta data request and a data request.

5. The method of claim 1, wherein receiving a multicasted message comprises receiving a multicasted message via a network in the distributed system.

6. The method of claim 1, wherein the state-changing response includes changing a state of data stored in the host.

7. A distributed system comprising:
   a plurality of hosts, each host being included in a subset of hosts operable to respond to at least a first or second type of request;
   wherein each host is operable to receive a multicasted message including a request, determine whether the request is of the first or second type said request, and respond to the first type of request while ignoring the second type of request if the host is in a subset responding to the first type of request;
   wherein multiple hosts in the subset for said first type of said request respond to the first type of said request and generate multiple responses from the multiple hosts in said subset for said first type of said request and determine whether responding to said request includes providing a state-changing response;
   wherein said subset for said first type of said request includes a synchronization host, said synchronization host is operable to facilitate transmitting a single response to a client in response to said multiple hosts in said subset generating the state-changing response; and
   wherein said multiple hosts in said subset transmit responses to said client in response to said multiple hosts in said subset generating a non-state-changing response.

8. The distributed system of claim 7, wherein said first and second type of requests includes one of a meta data request and a data request.

9. The distributed system of claim 7, wherein the plurality of hosts are connected to at least one network in the distributed system and are operable to receive the multicasted message via the at least one network.

10. The distributed system of claim 7, wherein the state-changing response includes changing a state of data stored in a host in the subset.

11. A computer readable medium on which is embedded a program, the program performing a method of responding to a request in a distributed system, said distributed system including a plurality of hosts, wherein each host is operable to respond to at least one type of request, the method comprising steps of:

receiving a multicasted message, said message including a request;

determining if said request is of a first type or a second type;

responding to said request if said request is of the first type;

ignoring said request if said request is of the second type; and designating a subset of said plurality of hosts for said first and second types of request;

wherein said step of responding further comprises a host of said plurality of hosts responding to said request in response to said host being included in a subset for said first type of said request; and wherein said step of responding further comprises determining whether responding to said request includes providing a state-changing response; generating multiple responses from multiple hosts in said subset for said first type of said request; transmitting said multiple responses to a client in response to said responding including a non-state-changing-response; and synchronizing said multiple responses by transmitting a single response to said client in response to said multiple hosts in said subset generating the state-changing-response.

12. The computer readable medium of claim 11, wherein said first and second types of requests includes one of a meta data request and a data request.

13. The computer readable medium of claim 11, wherein receiving a multicasted message comprises receiving a multicasted message via a network in the distributed system.

14. The computer readable medium of claim 11, wherein the state-changing response includes changing a state of data stored in the host.

* * * * *